(12) United States Patent
Miner

(10) Patent No.: US 9,807,337 B2
(45) Date of Patent: Oct. 31, 2017

(54) STORAGE AND EDITING OF VIDEO OF ACTIVITIES USING SENSOR AND TAG DATA OF PARTICIPANTS AND SPECTATORS

(71) Applicant: Fleye, Inc., Brentwood, NH (US)

(72) Inventor: Cameron Miner, Brentwood, NH (US)

(73) Assignee: Fleye, Inc., Brentwood, NH (US)

( * ) Notice: Subject to any disclaimer, the term of this patent is extended or adjusted under 35 U.S.C. 154(b) by 0 days.

(21) Appl. No.: 14/849,089

(22) Filed: Sep. 9, 2015

(65) Prior Publication Data

US 2016/0071541 A1    Mar. 10, 2016

Related U.S. Application Data

(60) Provisional application No. 62/048,655, filed on Sep. 10, 2014.

(51) Int. Cl.
*G11B 27/00* (2006.01)
*H04N 5/232* (2006.01)
(Continued)

(52) U.S. Cl.
CPC ............. *H04N 5/77* (2013.01); *G11B 27/031* (2013.01); *G11B 27/30* (2013.01); *G11B 27/34* (2013.01); *H04N 5/232* (2013.01); *H04N 9/8205* (2013.01)

(58) Field of Classification Search
CPC ........... H04N 5/181; H04N 5/246; H04N 5/77
See application file for complete search history.

(56) References Cited

U.S. PATENT DOCUMENTS 5,576,838 A    11/1996 Renie
5,655,053 A    8/1997 Renie
(Continued)

FOREIGN PATENT DOCUMENTS

CN    105051702 A    11/2015
EP    1 578 130 A1    9/2005
(Continued)

OTHER PUBLICATIONS

Heinemann et al., "iClouds-Peer-to-Peer Information Sharing in Mobile Environments," Euro-Par 2003 Parallel Processing, Lecture Notes in Computer Science, vol. 2790, pp. 1038-1045, 2003.
(Continued)

*Primary Examiner* — Huy T Nguyen
(74) *Attorney, Agent, or Firm* — Patent GC LLC

(57) ABSTRACT

Video from multiple locations in a venue, in which multiple individuals are engaged in activities, such as athletic performances or non-sporting activities, is stored and edited, using sensor data from participants and tag data from spectators, to create individualized video programs of athletic performances of individuals. Each camera provides a video feed that is continuously stored. Each video feed is stored in a sequence of data files in computer storage, which data files are created in regular time intervals. Each file is accessible using an identifier of the camera and a time interval. Similarly, data from sensors and tagging devices are continuously received and stored in a database. The database stores, for each sensor, an identifier of each individual detected in the proximity of the sensor and the time at which the individual was detected. Each sensor is associated with one or more cameras. Tag data is similarly stored from tagging devices manipulated by spectators.

20 Claims, 9 Drawing Sheets

(51) Int. Cl.
- *H04N 5/77* (2006.01)
- *G11B 27/031* (2006.01)
- *G11B 27/34* (2006.01)
- *G11B 27/30* (2006.01)
- *H04N 9/82* (2006.01)

(56) References Cited

U.S. PATENT DOCUMENTS

| | | |
|---|---|---|
| 5,694,514 A | 12/1997 | Evans et al. |
| 5,751,885 A | 5/1998 | O'Loughlin et al. |
| 6,449,010 B1 | 9/2002 | Tucker |
| 6,466,259 B1 | 10/2002 | Stanton |
| 6,526,158 B1 | 2/2003 | Goldberg |
| 6,650,360 B1 | 11/2003 | Osen |
| 6,778,171 B1 | 8/2004 | Kikinis |
| 6,813,586 B1 | 11/2004 | Vock et al. |
| 6,824,317 B2 | 11/2004 | Finizio et al. |
| 6,990,681 B2 | 1/2006 | Wang et al. |
| 7,046,273 B2 | 5/2006 | Suzuki |
| 7,054,784 B2 | 5/2006 | Flentov et al. |
| 7,327,383 B2 | 2/2008 | Valleriano et al. |
| 7,512,515 B2 | 3/2009 | Vock et al. |
| 7,603,255 B2 | 10/2009 | Case, Jr. et al. |
| 7,623,987 B2 | 11/2009 | Vock et al. |
| 8,051,452 B2 | 11/2011 | Arseneau et al. |
| 8,077,981 B2 | 12/2011 | Elangovan et al. |
| 8,451,333 B2 | 5/2013 | Sandler et al. |
| 8,711,224 B2 | 4/2014 | Sandler et al. |
| 8,856,553 B2 | 10/2014 | Lyakhovitskiy et al. |
| 9,108,098 B2 | 8/2015 | Galasso et al. |
| 9,230,599 B2 | 1/2016 | Miner |
| 2003/0030658 A1 | 2/2003 | Gibbs et al. |
| 2003/0049591 A1 | 3/2003 | Fechter et al. |
| 2003/0058344 A1 | 3/2003 | Mino |
| 2003/0179294 A1 | 9/2003 | Martins |
| 2004/0100566 A1 | 5/2004 | Valleriano et al. |
| 2004/0169587 A1 | 9/2004 | Washington |
| 2004/0201738 A1 | 10/2004 | Moores, Jr. et al. |
| 2005/0093976 A1 | 5/2005 | Valleriano et al. |
| 2005/0202905 A1 | 9/2005 | Chesser |
| 2006/0066723 A1 | 3/2006 | Iwase et al. |
| 2006/0078047 A1 | 4/2006 | Shu et al. |
| 2006/0095340 A1 | 5/2006 | Iadanza et al. |
| 2007/0039030 A1 | 2/2007 | Romanowich et al. |
| 2007/0052803 A1 | 3/2007 | Chosak et al. |
| 2007/0058041 A1 | 3/2007 | Arseneau et al. |
| 2007/0091178 A1 | 4/2007 | Cotter et al. |
| 2007/0279494 A1 | 12/2007 | Aman et al. |
| 2008/0018785 A1 | 1/2008 | Bennett |
| 2008/0198230 A1 | 8/2008 | Huston |
| 2008/0251575 A1 | 10/2008 | Bowling et al. |
| 2008/0303901 A1 | 12/2008 | Variyath et al. |
| 2009/0040301 A1 | 2/2009 | Sandler et al. |
| 2009/0041298 A1 | 2/2009 | Sandler et al. |
| 2009/0144785 A1 | 6/2009 | Walker et al. |
| 2009/0150114 A1 | 6/2009 | Vock et al. |
| 2009/0153654 A1 | 6/2009 | Enge et al. |
| 2009/0262194 A1 | 10/2009 | Wakefield et al. |
| 2010/0026809 A1 | 2/2010 | Curry |
| 2010/0144414 A1 | 6/2010 | Edis et al. |
| 2010/0182436 A1 | 7/2010 | Boman et al. |
| 2011/0071792 A1* | 3/2011 | Miner ............... G06K 9/00771 702/182 |
| 2011/0090344 A1 | 4/2011 | Gefen et al. |
| 2011/0228098 A1 | 9/2011 | Lamb et al. |
| 2012/0162436 A1 | 6/2012 | Cordell et al. |
| 2012/0308209 A1 | 12/2012 | Zaletel |
| 2013/0100268 A1 | 4/2013 | Mihailidis et al. |
| 2013/0182117 A1 | 7/2013 | Arseneau et al. |
| 2013/0286212 A1 | 10/2013 | Sandler et al. |
| 2013/0297368 A1 | 11/2013 | Meyer et al. |
| 2014/0105577 A1* | 4/2014 | Wang ............... G08B 13/19671 386/241 |
| 2014/0219628 A1* | 8/2014 | Miner ............... G11B 27/10 386/227 |
| 2015/0294514 A1* | 10/2015 | McCollum ......... G07C 9/00111 340/5.81 |
| 2016/0260459 A1 | 9/2016 | Miner |
| 2016/0261650 A1 | 9/2016 | Miner |

FOREIGN PATENT DOCUMENTS

| | | |
|---|---|---|
| EP | 2 948 850 A1 | 12/2015 |
| WO | 2005/025234 A1 | 3/2005 |
| WO | 2011/001180 A1 | 1/2011 |
| WO | 2012/027626 A2 | 3/2012 |
| WO | 2014/116689 A1 | 7/2014 |
| WO | 2016/040475 A1 | 3/2016 |

OTHER PUBLICATIONS

Kosmopoulos, et al., "Vision-Based Production of Personalized Video" Signal Processing: Image Communication, vol. 24, Issue 3, Dec. 17, 2008, 39 Pages.

Underwood, S., "Making sense of real-time behavior," Communications of the ACM, vol. 53, Issue 8, Aug. 2010, pp 17-18.

International Search Report received for PCT Application No. PCT/US11/49252, dated Mar. 23, 2012, 5 Pages.

Non-Final Office Action dated Jun. 8, 2012 in related U.S. Appl. No. 12/869,096, filed Aug. 26, 2010, 11 Pages.

International Preliminary Report on Patentability and Written Opinion received for PCT Application No. PCT/US2011/049252 dated Mar. 7, 2013, 12 Pages.

Final Office Action dated Jun. 7, 2013 in related U.S. Appl. No. 12/869,096, filed Aug. 26, 2010, 15 Pages.

International Search Report and Written Opinion received for PCT Application No. PCT/US2014/012528, dated May 13, 2014, 12 Pages.

Final Office Action dated Oct. 2, 2014 in related U.S. Appl. No. 12/869,096, filed Aug. 26, 2010, 16 Pages.

Non-Final Office Action dated Feb. 13, 2015 in related U.S. Appl. No. 14/160,677, filed Jan. 22, 2014, 18 Pages.

International Preliminary Report on Patentability and Written Opinion received for PCT Application No. PCT/US2014/012528 dated Jul. 28, 2015, 4 Pages.

Notice of Allowance dated Sep. 23, 2015, in related U.S. Appl. No. 14/160,677, filed Jan. 22, 2014, 9 Pages.

International Search Report and Written Opinion received for PCT Application No. PCT/US2015/049177 dated Jan. 4, 2016, 6 Pages.

Non-Final Office Action dated Feb. 12, 2016 in related U.S. Appl. No. 12/869,096, filed Aug. 26, 2010, 36 Pages.

Non-Final Office Action dated Jul. 21, 2016, in related U.S. Appl. No. 14/986,751, filed Jan. 4, 2016, 24 Pages.

Extended European Search Report received for EP Application No. 14743265.2, dated Sep. 15, 2016, 8 pages.

Final Office Action dated Nov. 17, 2016 in related U.S. Appl. No. 12/869,096, filed Aug. 26, 2010, 23 Pages.

Office Action received for CN Application No. 201480017578.6, dated Dec. 5, 2016, 3 Pages.

Notice of Allowance dated Feb. 16, 2017 in related U.S. Appl. No. 14/986,751, filed Jan. 4, 2016, 12 Pages.

Non-Final Rejection Received for U.S. Appl. No. 12/869,096 dated Jun. 28, 2017, 25 pages.

Third Office Action received for CN Application No. 201480017578.6, dated Jul. 5, 2017, 6 pages.

* cited by examiner

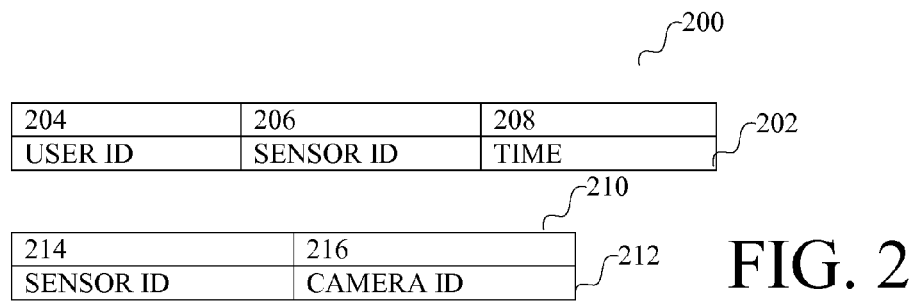
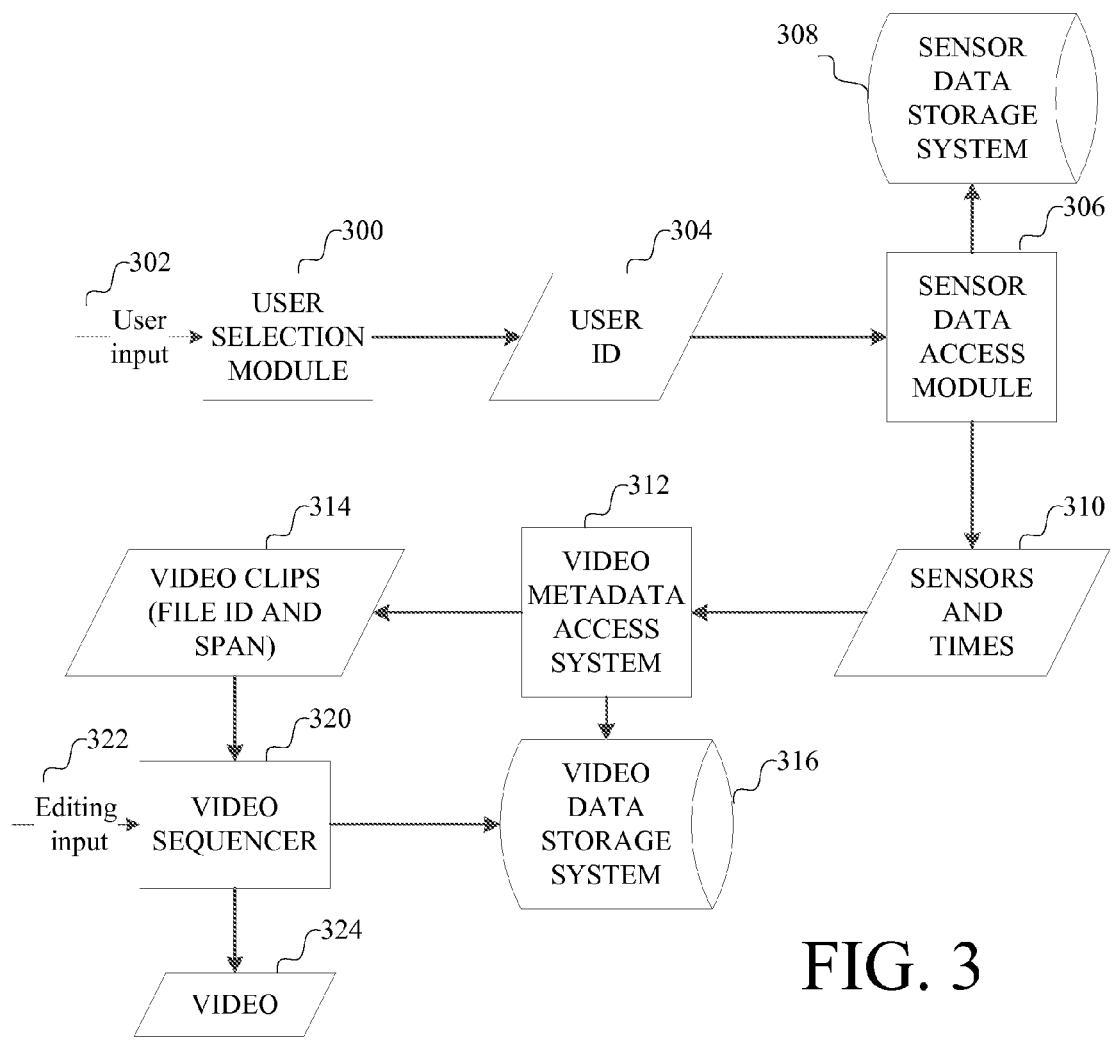

STORAGE AND EDITING OF VIDEO OF ACTIVITIES USING SENSOR AND TAG DATA OF PARTICIPANTS AND SPECTATORS

CROSS-REFERENCE TO RELATED APPLICATIONS

This application is a non-provisional patent application of, and claims priority to and the benefit of the filing date of, provisional patent application Ser. No. 62/048,655, filed Sep. 10, 2014, entitled "Storage and Editing of Video of Activities using Sensor and Tag Data of Participants and Spectators", which is hereby incorporated by reference.

BACKGROUND

There is an increasing demand among individuals who participate in a variety of athletic and other activities to have access to video and other data about their performance. This demand is especially increasing for activities in large venues with large numbers of people, such as skiing, snowboarding, bicycling, running and the like. Non-sporting activities, such as concerts, dance performances, school performances, graduations, and the like, also can have video.

Spectators of activities also may be interested in accessing video data from an activity. Such spectators can include fans, coaches, teammates, and others who may be interested in the activity but are not active participants.

Creating edited videos of individuals participating in such activities can be time consuming It can be difficult to efficiently capture and store video data for such activities, and then compile edited video programs for each of multiple individuals in such activities, especially given multiple video feeds, data feeds and participants.

SUMMARY

This Summary is provided to introduce a selection of concepts in a simplified form that are further described below in the Detailed Description. This Summary is intended neither to identify key or essential features of the claimed subject matter, nor to limit the scope of the claimed subject matter.

Video data and sensor data from multiple locations in a venue, in which multiple individuals are engaged in athletic performances, is stored and edited to create individualized video programs of athletic performance of selected individuals. Sensors and video cameras can be in fixed locations in the venue, can be worn by participants, can be movable within the venue, and/or can be handled by spectators.

Each camera provides a video feed that can be continuously stored. Recording can be started at the beginning of an event, or can be triggered by processing sensor data, such as proximity or motion detection, or can be triggered by an individual, such as a participant or spectator, using a device, such as an application on a smart phone or a wearable device that has an input. Each video feed is stored in a sequence of data files in computer storage. In some implementations, a sequence of data files can be created in regular time intervals from continually recorded video. In some implementations, video data files can be stored in irregular time intervals, such as when a camera captures only a portion of the event. Each data file is accessible using an identifier of the camera from which the video feed is received, and an index of time intervals representing the time period from the camera from which the file stored the video data.

Similarly, data from sensors is continuously received and stored in a database. In one implementation, the database stores, for each sensor, an identifier of each individual detected in the proximity of the sensor and the time at which the individual was detected. Each sensor is associated with one or more cameras. Generally, such sensors associate a participant with the video of an activity.

In addition, tag data can be received from others, herein called spectators, that may be viewing an activity, whether live or recorded, whether in person or remotely from the actual location of the activity. Raw tag data can be received from any kind of device, and can be received as merely an indication of a point in time. Generally speaking, a spectator watching an event can indicate, through merely pressing a button or other simple interaction with a device, interest in a point in time in the activity. For example, after an interesting play in a basketball game, a spectator may "tag" that point in time as a point of interest in the basketball game. In a tag database, tag data is stored that associates a user identifier, indicating a device or individual from which the raw tag data originates, with an activity and the point in time.

In one implementation, to generate a video program of an individual participating in an activity, given an identifier of the individual, the sensor data is accessed to identify when the individual was in the proximity of any of the sensors. This data can be in the form of a sensor identifier and time stamp. The sensor identifier is mapped to a "zone" which may include one or more cameras. An index of the files captured on the corresponding cameras is used to identify data files available from that camera. The time stamps are used to specify an interval of time, which in turn identifies one or more of the data files for the camera. Given the identified video files, the time stamps from the sensor data can in turn be used to select a clip (a time interval of the video data in the file) from each video file. The time interval can be defined by in points and out points, using an amount of time preceding and following the given time stamp from the sensor data. The clips can be requested for transfer from the camera immediately or at any time when the files are available for transfer to the server. While the index of all available video is maintained in the database, it may be that only the required "clip" is transferred from a camera to the server and stored. In other instances, it may be possible to upload the entire video file to the server for future processing. The clips can then be placed in sequence in order according to the time stamp to provide an initial sequence of clips for the video program of the individual's entire performance. This sequence of clips can be modified and edited easily by changing the order, duration, transitions, and other modifications applied to the clips.

In another implementation, a video program can be generated for a spectator of an activity based on the tag data related to that spectator. Given a user identifier corresponding to the spectator, the system can retrieve the points in time stored in the tag database and the corresponding activity. If the spectator is in a venue with more than one activity, then the system can provide information to allow a user to select an activity. If the activity has more than one zone, the spectator can select from available zones. The activity and zone and the point and time in turn allow the system to identify and access data files containing the video data for the activity. Such selection can be used in combination with selection of a participant in the activity. Alternatively, or in combination, the system also can allow a user to select one or more cameras, if there are multiple camera views available for the same point in time. Thus, points in time from the tag database are used to specify an interval of time, which in turn identifies one or more of the data files. Given the identified video files, the points in time from the tag data can in turn be used to select a clip (a time interval of the video data in the file) from each video file. The time interval can be defined by in points and out points, using an amount of time preceding and following the given point in time from the tag data.

An edited video can be distributed to individuals, whether participants or spectators, in many ways. For example, an individual may receive a link to a data file stored on a computer, such as a uniform resource locator (URL) for accessing a data file accessible through a server computer on a computer network. A storage medium with the video also could be made and provided to the individual.

Depending on the nature of the activity, the system can limit or manage access to the video of the activity by spectators based on various factors. For example, the system can associate various rights or permissions with each spectator, such as by using a database, using digital rights management technologies, using authentication procedures and the like. For example, if the activity is a children's event, then video may be limited to spectators that are parents or have a signed authorization from the children's parents. As another example, if the activity is a professional sporting event, then the system can limit access to video to spectators that have a paid subscription. Another example may be highlights that are available to coaches, parents, scouts, or the participants for analysis as part of a subscription based package. In this way, events and performances can offer "premium" content to participants and spectators that can only be accessed by authorized customers. Such limitations on access can be represented in the computer system using a database table that associates spectators with a particular activity, and possibly particular participants in the activity. Such a database table also can include an expiration date and time for the authorization. Such authorizations can limit the length, format or other characteristics of the video that is received.

The video data can be stored in both a high resolution and a low resolution. Either resolution can be selected for output of the edited video program. Alternatively, the video data can be stored in only a high resolution and low resolution versions can be generated dynamically on demand. The high resolution files also can be used to generate still images and/or composite images on demand The low resolution images are better suited to, for example, streaming over a network.

In the following description, reference is made to the accompanying drawings which form a part hereof, and in which are shown, by way of illustration, specific example implementations. Other implementations may be made without departing from the scope of the disclosure.

DESCRIPTION OF THE DRAWINGS

FIG. 2 is an illustration of an example database that can be used in an example implementation of the system of FIG. 1.

FIG. 3 is a data flow diagram illustrating an example implementation of the system of claim 1.

DETAILED DESCRIPTION

Figure 1:
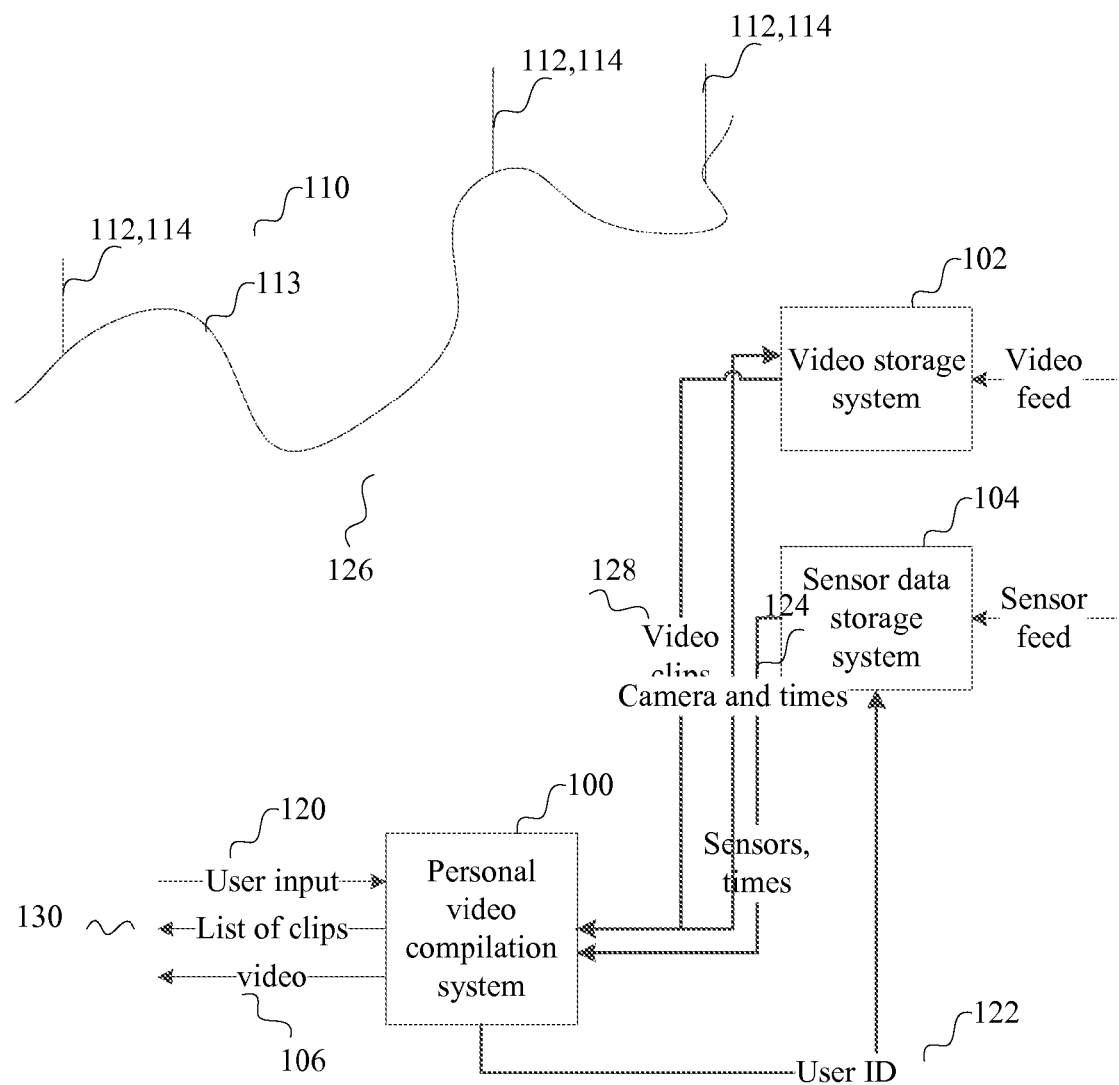
FIG. 1 is a block diagram of a system that captures video and sensor data from multiple cameras and sensors in a venue.

The following section provides an example operating environment in which this video system can be implemented.

This system allows for the capture, playing video on the web, other forms of video distribution, and selecting full resolution clips and still images from the video streams for various forms of distribution. The methods are efficient and scalable to thousands of users, and higher resolutions. The technology can be applied to the original source video file or to a "proxy" video file which has been reduced in resolution and/or higher compression.

The system is particularly useful for application where there is a need to have large amounts of video accessed by a large number of people.

One example of this is for a race, where there may be tens of thousands of people accessing video from dozens of cameras that were capturing the event throughout the day. Each person only wants to see his or her own video clips, and may want to be able to adjust the duration of the video clip. This system allows them to view their own video clip, adjust them, and share them with others in an efficient manner. Additionally, this system allows them to select a clip (which may be as short as a single frame) to download at full resolution.

Another example is a children's soccer game or practice. Each parent, as well as coaches, friends, and family, may be interested in having access to video of a game, season of games, or just a practice. Often they have neither the skill nor patience nor resources to take the time to put together a good quality video. By using a tagging device (such as described below), where a person can enter a point in time through a very simple gesture, individuals can "tag" points in time in an activity, indicating their interest in the video for the activity at that point in time. For example, a parent may "tag" the point in time when a child makes a score in a soccer game. Or, a coach may "tag" a point in time in a practice when something occurs that the coach wants to talk with a player about.

Another example is a professional sporting event. A fan of a team, whether actually present at the event, or viewing it remotely, or viewing it at a later point in time as a recording, can "tag" points in time during the event to make a personal highlight reel of the event.

In such a system, video and images are captured at a venue on a number of cameras. For some activities, there may be only one camera. Each video clip or still image from the camera is associated with a time stamp and a location.

For each participant in an activity being recorded by the system, time-stamped location information can be logged (via RFID, GPS, BlueTooth, WiFi, or any other means of identifying individuals at a specific location) and this information can be used to create a list of "virtual clips" for the participant. These "virtual clips" reference a lower-resolution proxy video which can be used, for example, for playback on a website.

The in and out points of a clip can be calculated from a time stamp from sensor data or tag data, and a variable amount of time preceding the time stamp, and a variable amount of time following the time stamp. These variable amounts can be different for preceding and following values, and can be different for each camera. A user can adjust the "in" and "out" points for the virtual clip, allow them to change the duration of the clip. This same information can also be used to select and download the full resolution video files. If the virtual clip's in and out points are brought together to include just a single frame, the full resolution frame can be considered a "still image" or "photo" and it can be downloaded or used to make a print (e.g. 3×5, 4×6, 8×10, wall size, etc.).

Thus, referring to FIG. 1, a personal video compilation system 100 accesses a video storage system 102 and a sensor and tag data storage system 104 to allow a user to access a compiled video program 106 of an activity. The user may be a participant accessing their own performance video. The user may be a spectator (or participant) accessing video of the activity. Some example environments in which such systems can be used are described in detail in U.S. Patent Publication 20110071792 (the "Related Publication"). In general, a venue 110 is provided in which multiple individuals are participating in an athletic activity, such as a foot race, a bicycle race, a triathlon, downhill skiing, snowboarding, cross-country skiing and the like, which may take place along a path 113 or a loop, or within a space. The venue also can be a venue in which non-sporting activities, such as concerts, dance performances, school performances, graduations, and the like, can take place. The venue also can be a stadium or playing field or rink or court or other venue in which an athletic activity is performed. The system also can be used for other activities for which video may be recorded, such as a concert. Within the venue, multiple cameras 112 and associated sensors 114 are provided. A sensor may have access to any time code available from its associated camera.

In general, cameras 112 provide a continuous video feed during the activity being recorded. Notably, given tag and sensor data captured as described below, video can be transferred, deleted or not stored if there is no tag data or sensor data associated with the video at any given point in time.

The sensors 114 can provide a continuous data feed, but generally provide useful data when an individual is detected in the proximity of the sensor. Any sensor technology can be used so long as the sensor can provide an indication of an individual that is in its proximity at a given point in time. For example, the sensor can detect the presence of an RFID tag for an individual using an RFID detector, and then receive time stamp data from a timer on its associated camera. A variety of other sensors can be used as described in the Related Publication.

Tagging devices 115 provide point in time information sporadically based on individual's behavior with the tagging device. As such, "tags" can be treated as random occurrences. In general, an individual performs a simple gesture with a tagging device, causing the device to capture the current time and send that information to the system, in a manner allowing the system to also identify the tagging device (and thus distinguish tags from one device from tags from other devices). Any sensing technology that can capture a point in time with a simple gesture would be useful for this purpose. As an example, a "tap" on the screen of device with a touchscreen, such as a mobile phone or wearable computing device, such as a watch, wristband, glasses, etc., can be captured by an application on that device that, in response to the tap, captures the current point in time and sends it to the system. As another example, a switch on a USB device can provide an input to a computer, causing the computer to capture the current point in time and send it to the system. Such inputs can be provided both while viewing an activity as the activity occurs (live), or while viewing a recording of the activity. In the latter case, the current time from the tagging device would be correlated with the current point in time in playback of the recording, whether by the tagging device or other part of the system that has access to the playback time for the recording.

The video storage system 102 receives video feeds including video data from the multiple cameras and stores the video data into data files on computer storage. In general, the video storage system is implemented using a server computer that receives and stores video data, including index of available files as well as the video files, from multiple remote cameras through an interface (not shown). The transfer of video can be continuous, on-demand, or at any time that the camera is able to transfer data to the server.

The sensor data storage system 104 receives sensor data feeds including sensor data from the multiple sensors and stores the sensor data into a database. In general, the sensor data storage system is implemented using a server computer that receives and stores sensor data from multiple remote sensors through an interface (not shown).

The tag data storage system 105 receives tag data from the multiple tagging devices and stores tag data in a database. In general, the tag data storage system is implemented using a server computer that receives and stores tag data from multiple remote tagging devices through an interface (not shown).

During an activity, the video storage system, the sensor data storage system and the tag data storage system may continuously record video data from the cameras, record sensor data from the sensors in the venue, and record any tag data received from tagging devices. Video, sensor and tag data can also be received and processed after the event. At any point after data is recorded, the personal video compilation system can access the index of recorded video, video data files, sensor data and tag data to retrieve video data for an individual.

In particular, in response to user input 120, the personal video compilation system uses an identifier 122 of an individual to access the sensor data storage system and/or the tag data storage system. From these data storage systems, the compilation system receives the sensors and/or tags with corresponding times 124. Because sensors are mapped to camera identifiers, the camera identifiers, and time stamps 126 can be used to access the corresponding sections of the video data files stored in the video storage system. Tag data can be mapped to a participant, and in turn sensor identifiers and camera identifiers corresponding to that participant. Alternatively, tag data can be used to provide points in time. Video clips 128 (such as a file name and a time span with that file name) can be returned by the video storage system. The compilation system 100 then can provide a list of clips 130, compiled video 106 or other output based on the retrieved video clips 128.

Given this context, an example implementation of this system will be described in more detail in connection with FIGS. 2-5.

In FIG. 2, an example implementation of a database for the sensor data now will be described. Each sensor provides a data pair including an identifier of an individual and a time at which the individual was in the proximity of the sensor. This data can be stored in a database such as shown in FIG. 2. A database table 200 can include a row 202 for each sensor event. The database table can be provided for each sensor, or the sensor identifier can be included as a column (e.g., 206) in the database table. Each row 202 has the individual identifier 204 and the time 208 at which the individual was in the proximity of the sensor. Another table 210 includes rows 212 that relate sensor identifiers 214 to camera identifiers 216. Other mechanisms can be used to track the relationship between sensors and cameras, including not using a database or other explicit record and relying on naming conventions.

Time and date stamps also can be used. Instead of running a camera continuously for an event, recording during the event can be triggered using outputs from the sensor associated with a camera. A list of time stamped data files by camera also can be stored, with the time and data stamps and camera identifier for the corresponding video being used as part of the file names.

As another example implementation, a database can include a row for each individual identifier, and a column for each sensor, for storing the time at which the individual was in the proximity of the sensor. The database can be implemented in many ways, including but not limited to a spread sheet data file or a relational database.

Figure 9:
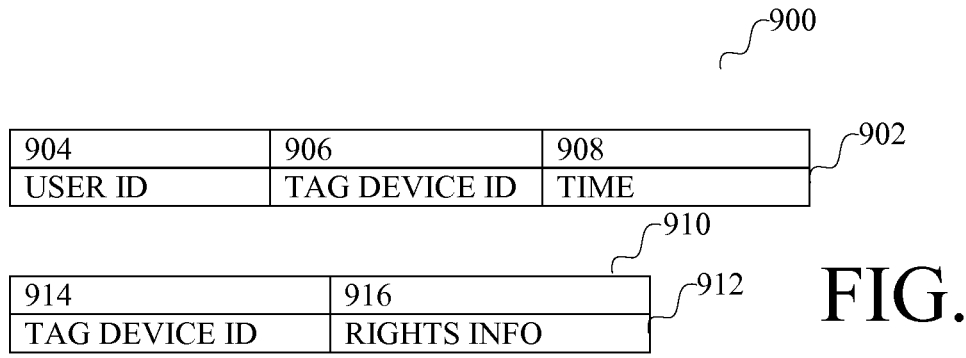
FIG. 9 is an illustration of an example database that can be used in an example implementation of the system of FIG. 1.

Similarly, in FIG. 9, an example implementation of a database for tag data now will be described. Each tagging device provides a data pair including an identifier of the tagging device and a time at which a spectator "tags" the event. This data can be stored in a database such as shown in FIG. 9. A database table 900 can include a row 902 for each tag event. The database table can be provided for each tagging device, or an identifier of a tagging device can be included as a column (e.g., 906) in the database table. Each row 902 has the user identifier 904 and a time 908 at which the spectator tags a point in time using the tagging device. Another table 910 includes rows 912 that relate tagging device identifiers 914 to other information 916. Such other information that can be related to the tagging device includes rights, permissions, participants or other data used to control access to and distribution of the video data. Other mechanisms can be used to track rights and permissions related to tagging devices, including not using a database or other explicit record and relying on naming conventions. The tag data database can be implemented in many ways, including but not limited to a spread sheet data file or a relational database.

A more detailed data flow diagram of the system will now be described in connection with FIG. 3. A user selection module 300 receives user input 302 indicative of an individual to be selected. The identifier 304 of this individual is provided to a data access module 306, which accesses the sensor and/or tag data storage systems 308. From the sensor data storage system, the sensor identifiers and times of proximity are output; from the tag data storage system, the tag identifiers and times are output, as indicated at 310.

These identifiers and times are used by the video access module 312 to access data 314 about the various video files that are available in the video data storage system 316. The data 314 includes video clip identifiers and spans within those files. This information is provided to a video sequencer 320 for editing. The video sequencer 320 can be implemented using any kind of video editing system that can edit a video program using spans of video data within data files. The video sequencer 320 edits video according to editing inputs 322 and provides video output 324. The editing inputs depend on the nature of the video editing system. The video output can be in any format, including files or streaming output or a display. The video sequencer 320 also may use the sensor data for sorting and providing an initial sequence of the video clips.

Figure 4:
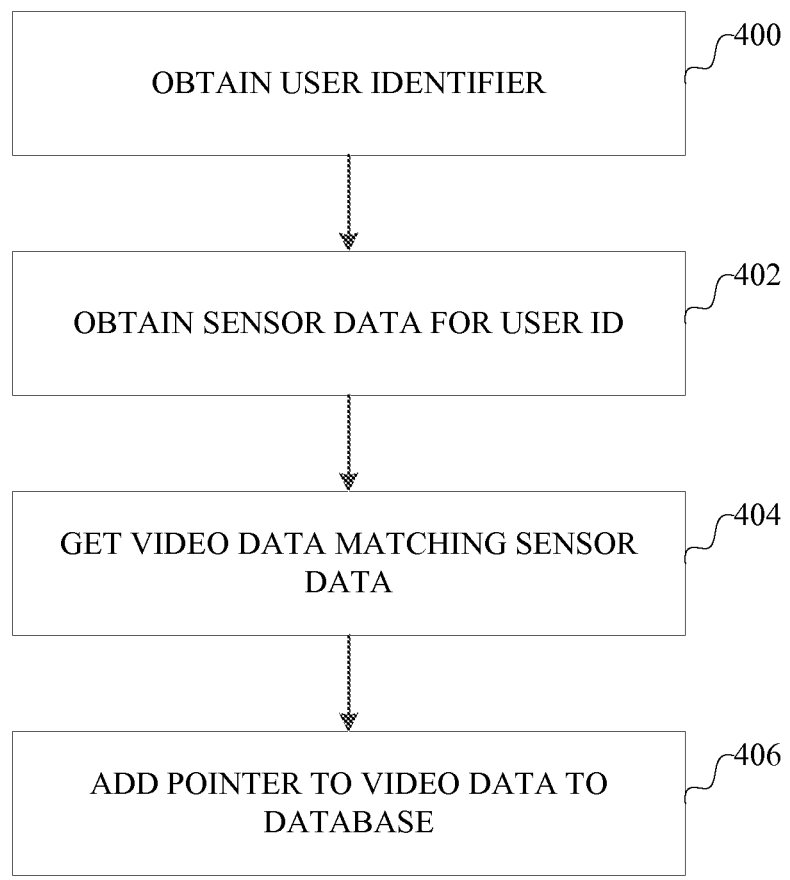
FIG. 4 is a flow chart describing an example operation of the system in FIG. 2.

Referring now to FIG. 4, a flowchart of an example implementation of this system will now be described. The system obtains 400 an identifier of a user, whether a participant or a spectator. Sensor data and/or tag data corresponding to the user identifier is then retrieved 402. Video clips matching the times from the sensor data and tag data can then be identified 404. Pointers or other references to the identified video clips then can be stored 406, such as in a database. Thus for any given participant, sensor data and references to video clips can be stored and retrieved for each participant. For any spectator, tag data can be used to make references to video clips, which can be stored and retrieved for the spectator. Subsequently, the clips then can be combined in time order, for example according to time stamps from the sensor data or tag data.

Figure 5:
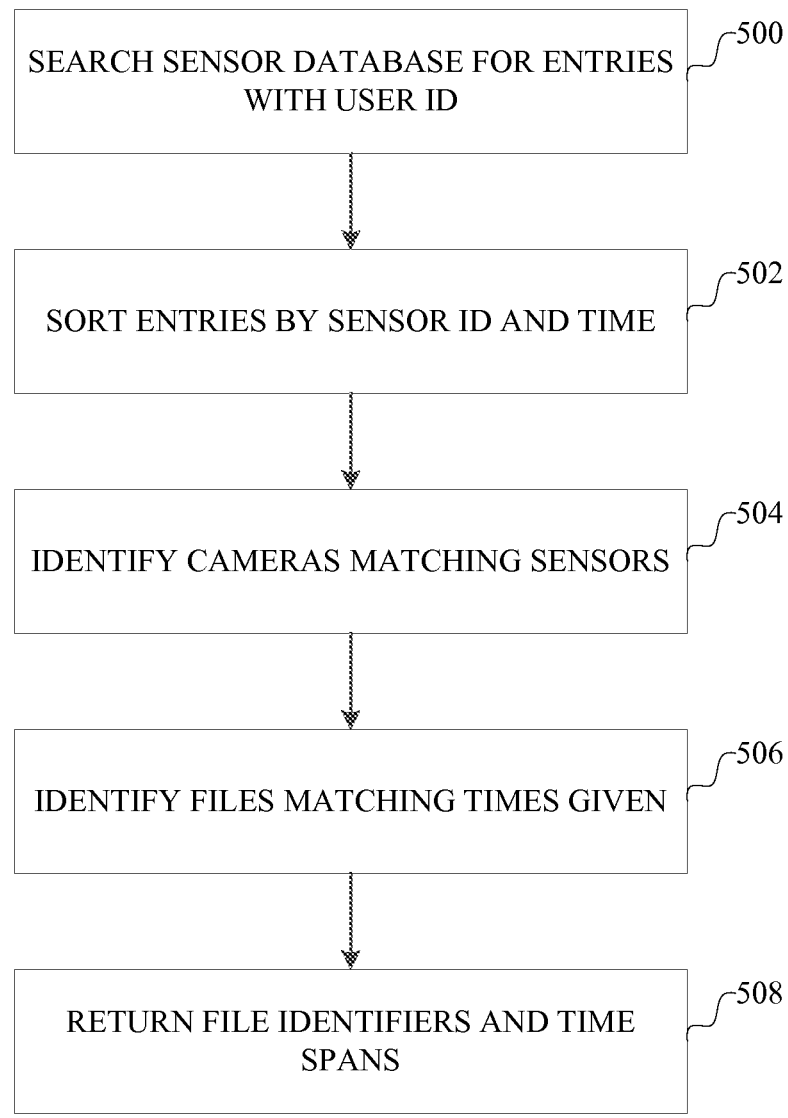
FIG. 5 is a flow chart describing an example operation of the system in FIG. 2.

Addressing more detail of this operation, we refer now to FIG. 5. Given a participant identifier, the sensor data storage is searched 500 for entries matching the participant identifier. These entries can be sorted 502 by sensor identifier and time. The cameras associated with each sensor identifier are then identified 504. The files for each camera for the given times are then identified 506. The file identifier and a span within the file are then returned 508.

Figure 10:
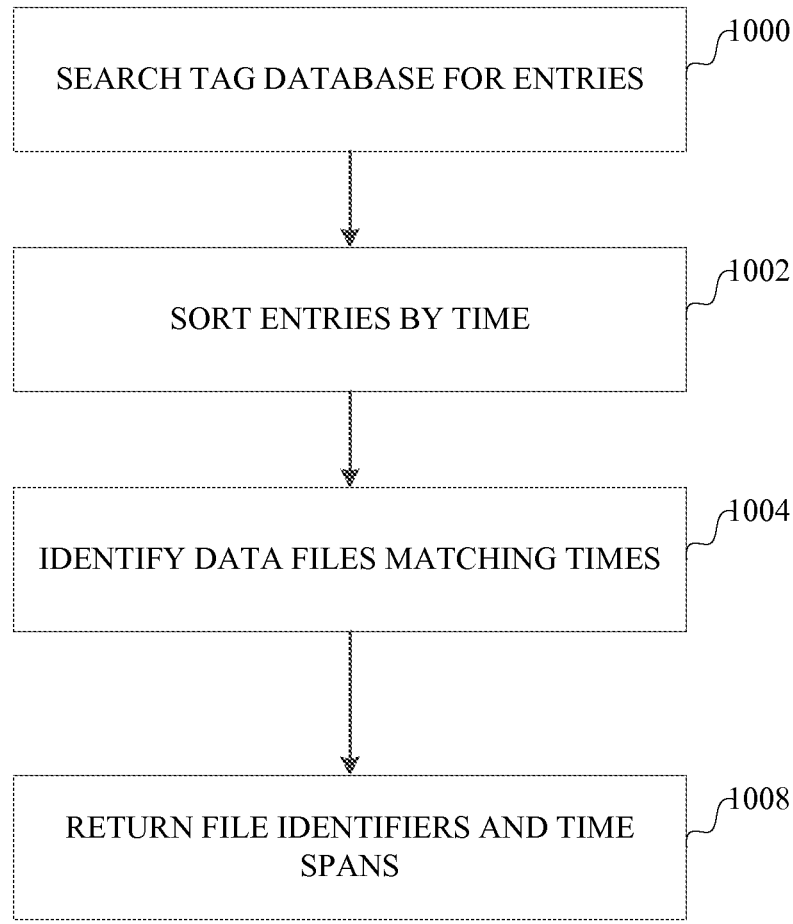
FIG. 10 is a flow chart describing an example operation of the system in FIG. 2.

Similarly, in FIG. 10, given a spectator identifier or tagging device identifier, the tag data storage is searched 1000 for entries matching the identifier. These entries can be sorted 1002 by time. Data files corresponding to the noted times are then identified 1004. The file identifier and a span within the file are then returned 1006. The data files can be a selection of files from all cameras. Alternatively, the spectator can be related to a participant, and, given the participant identifier and tag time stamp, corresponding cameras and data files can be identified.

A variety of other operations can be provided to an individual when the video file segments for that individual are identified. The individual can be allowed to edit the video, download a version of the edited video or selected video clips, generate and download a still image from the video clips, and share such information with others. Various video editing tools for trimming clips (i.e., changing the in and/or out points of clips), reordering clips in a sequence, adding filters, transitions, video effects, music, other audio and the like, also can be provided.

In some environments, cameras and/or sensors can be mobile. In the case where cameras are mobile, and sensors are stationary, location information available from a camera, and/or detection of proximity of the camera by a sensor, can be used to associate the camera with a sensor for a given period of time. In the case where both cameras and sensors are mobile, location information for the cameras and sensors, and/or detection of proximity of cameras to sensors, can be used to associate the camera with a sensor for a given period of time. Given the association of cameras and sensors for a periods of time, and events from sensors that have time and dates, a sequence of events from sensors over time can be automatically converted into a corresponding sequence of video clips over time.

Figure 7:
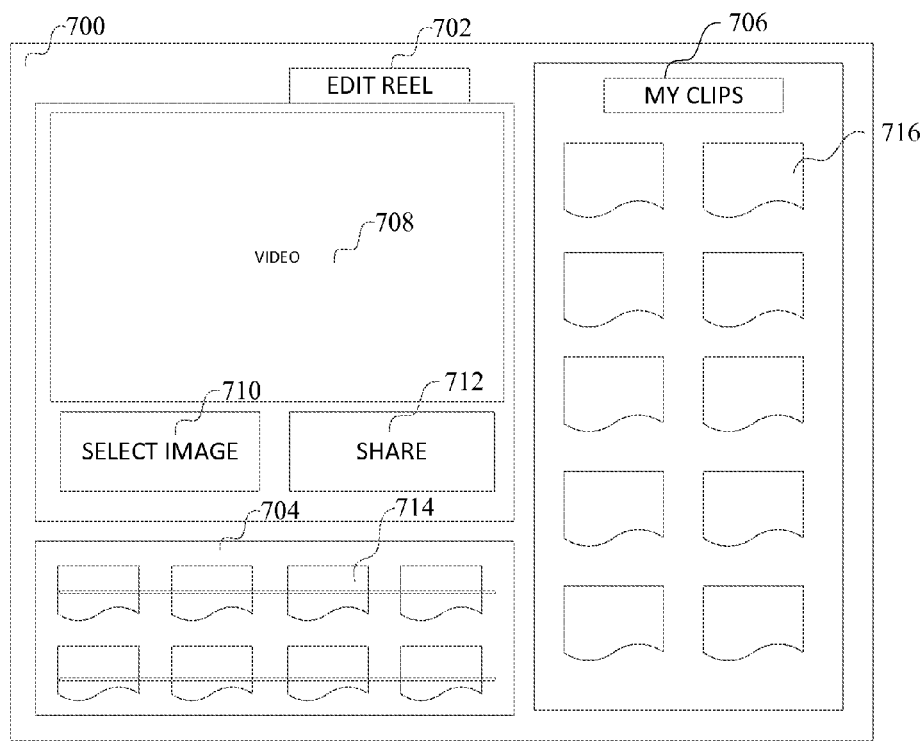
FIG. 7 is an example graphical user interface for editing a video from an event.
Figure 8:
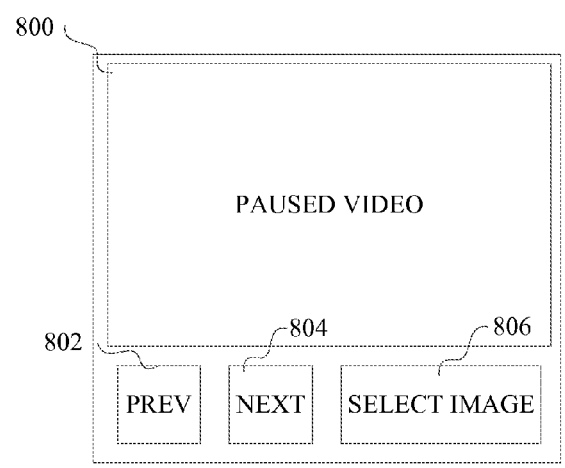
FIG. 8 is an example graphical user interface for selecting a still image.

Referring now to FIGS. 7 and 8, an example implementation of a graphical user interface for editing the video will now be described. Such an interface can be provided by, for example, an application on a computing device or in a web browser running on a computing device. The interface includes, in a display area 700, a viewing area 702, a sequencing area 704 and a clip collection area 706, defined as non-overlapping panes within the display area 700. Other arrangements of such areas also can be provided.

Within the viewing area 702, video is displayed in a video area 708. Various video playback controls (not shown) can be provided in this viewing area, as is conventional, such as play, stop, pause, fast forward, rewind, play in a loop, back to start, a position bar, and so on. The video displayed in the video area 708 is based on the sequence of video clips currently defined for this user.

Two user input buttons also are provided in the viewing area 702. One button 710 allows a user to select the currently viewed picture as a still image to be extracted for the user. In response to a user selecting button 710, another user interface can be displayed to allow the user to set and/or select various parameters for the still image to be created.

Referring to FIG. 8, an example still image selection interface is shown. In this interface, a video area 800 displays a currently selected image from the paused video. Control buttons, e.g., a previous button 802 and a next button 804, are provided. Various other control buttons can be provided to allow for different kinds of navigation. When a user manipulates the previous button 802, the system backs up the video one frame. When a user manipulated the next button 804, the system advances the video one frame. When a user is satisfied with the image, the user can manipulate a select image button 806 which selects that image for distribution to the user.

Another button 712 in the viewing area 702 allows a user to share the edited video. In response to a user selecting button 712, another user interface can be displayed to allow the user to set and/or select various parameters regarding how the video will be shared.

In the sequencing area 704, the system displays indications of each video clip 714 in the edited video program. An example representation of a sequence of video clips is illustrated in FIG. 7, but the invention is not limited thereto. Various editing operations, conventional for editing video, and visual representations of an edited sequence of clips, can be provided. Such editing operations can include adding, deleting, modifying the duration of (i.e., trimming), and reordering the video clips.

Similarly, in the clip collection area 706, the system displays indications 716 of each video clip containing images of the current user or a selected user. Clips can be selected and added from the clip collection area 706 into the edited sequence shown in 704.

The initial representation of the sequence in the sequencing area 704 is generated by time-ordering the clips retrieved from video storage relating to the current user, based on a user login or based on a selected user. Similarly, the collection of clips in the clip collection area 706 also is provided by selecting clips retrieved from video storage relating to the current user, based on a user login or based on a selected user. In the clip collection area 704, various sorting and searching tools can be provided to allow a user to search for and identify clips based on various attributes of the clip metadata or video data.

Figure 11:
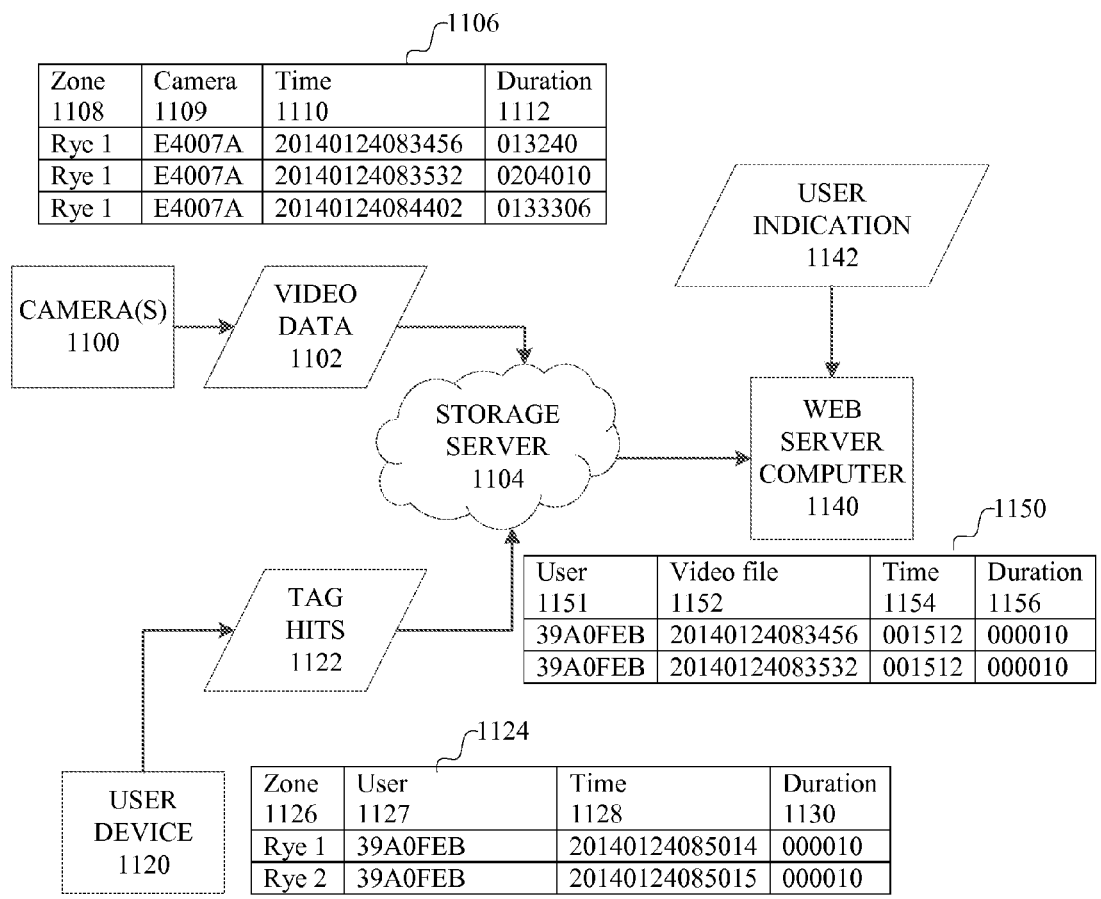
FIG. 11 is a diagram of an example implementation using tagging devices and cameras.

FIG. 11 illustrates of an example implementation of a system using tagging devices and cameras.

The system includes at least one camera 1100 from which video data 1102 is captured and stored in storage of one or more server computers, indicated at 1104 as server storage. Cameras 1100 can be connected to the server storage 1104 over any communication medium that allows for the transmission of the video data 1102. Various metadata, as indicated by camera video table 1106, can be stored in association with the video data 1102. Such metadata can include, for example, but is not limited to, an indication of a zone 1108 in which the camera is capturing video data, an identifier 1109 of the camera, a time 1110 associated with the captured video data and a duration 1112 of the video clip. Such metadata can be captured in the manner described above in connection with FIG. 1-2.

Various user devices 1120 also are in communication with the one or more server computers, indicated at 1104 as server storage. A user device can be, for example (but not limited to), a mobile phone, tablet computer, desktop computer, portable computer, or other device that, in response to a user gesture, such as pushing a button, tapping a touch screen or the like, can record a time at which that gesture occurred, and can provide such recorded times for transmission to the storage server. The user device 1120 also may incorporate a camera 1100 or receive video from a camera 1100.

Each user device 1120 can provide indications of tag hits 1122, each of which is associated with tag data that is stored in association with the user, such as in a tag table 1124. The tag data that can be stored in association with a user can include, for example, a zone 1126, a user identifier 1127, a time associated with a tag 1128 and optionally a duration 1130. Depending on the implementation, the tag table 1124 may be provided by the user device, or can be derived by the one or more server computers based on an indication of a tag hit 1122 that is received. In some cases, the duration 1130 can be a default value, or not stored, or can be based on a type of tag hit, or type of device providing the tag hit, or a user setting, or the like.

The system also can include a web server computer 1140, which is one or more computers that process web server software and is connected, on the one hand, to the storage server 1104 to access video data and, on the other hand, to the internet or other computer network through which other devices, used by end users, access the web server computer 1140 to request video data.

The web server computer 1140 receives an indication of a user 1142 and retrieves the tag data corresponding to the user from storage. The tag data in turn is used to identify video data that matches the tag data. In the example data shown in FIG. 11, a user clip table 1150 is identified by the web server computer 1140. This table can include, for example, user identifiers 1151, video files 1152, e.g., "20140124083456" and "20140124083532", which are identified as corresponding to a user tag, based on a match of the zones and times from the tag data and the zone, time and duration of the video data. A point in time 1154 in each file and a duration 1156 for each clip is identified.

Given a set of video clips based on tag hits from a user device, the web server computer can provide a variety of operations to users. Such operations can include various forms of editing and distribution, such as described above in connection with FIGS. 7 and 8. The video and operations on the video that are made available to the user also can be limited by permissions associated with the user.

In one example scenario, the camera can be a camera that includes a wireless communication connection, a commercially available example of which is the GOPRO camera. Another device, such as a mobile phone with a wireless communication connection, can detect the presence of the camera based on the signals emitted by the camera through its wireless communication connection. An application executed on the mobile phone can cause the mobile phone to record the detection of the camera in its proximity and the time, or times, or durations, at which such a detection occurred. In this way, an individual carrying the mobile phone can be determined to be in proximity of the camera, allowing video to be later retrieved based on the identified camera and times in which the individual was determined to be in proximity of that camera.

In another example scenario, the camera can include a wireless communication connection and a small computer on which an application can be executed. The camera can be programmed to detect the presence of other devices based on the signals emitted by the wireless communication circuitry on those devices, such as from a WiFi or Bluetooth or RFID or NFC circuitry on those devices. The application executed on the camera can cause the camera to record the detection of other devices in its proximity based on signals emitted by the wireless communication circuitry on those devices, along with the time, times or durations at which such detection occurred. Such data can be logged and also transmitted to storage servers, where the device data can be stored in association with the video files from that camera.

Figure 6:
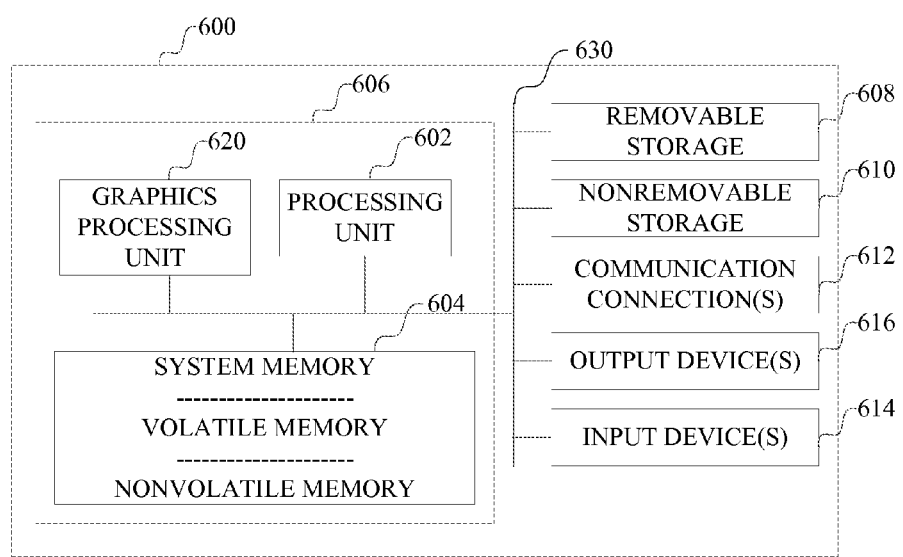
FIG. 6 is a block diagram of an example computing device in which such a system can be implemented.

Having now described an example implementation, FIG. 6 illustrates an example computer with which such techniques can be implemented. The following description is intended to provide a brief, general description of such a computer. The computer can be any of a variety of general purpose or special purpose computing hardware configurations. Examples of computers that can be used include, but are not limited to, personal computers, server computers, wearable or hand-held or laptop devices (for example, media players, notebook computers, cellular phones, personal data assistants, voice recorders, smart watches, glasses, wristbands, clips), multiprocessor systems, microprocessor-based systems, set top boxes, game consoles, programmable consumer electronics, network PCs, minicomputers, mainframe computers, distributed computing environments that include any of the above types of computers or devices, and the like.

FIG. 6 illustrates an example of a suitable computing system environment. The computing system environment is only one example of a suitable computing environment and is not intended to suggest any limitation as to the scope of use or functionality of such a computing environment. Neither should the computing environment be interpreted as having any dependency or requirement relating to any one or combination of components illustrated in the example operating environment.

With reference to FIG. 6, an example computer in a basic configuration includes at least one processing unit 602 and memory 604. The computer can have multiple processing units 602. A processing unit 602 can include one or more processing cores (not shown) that operate independently of each other. Additional co-processing units, such as graphics processing unit 620, also can be present in the computer. The memory 604 may be volatile (such as RAM), non-volatile (such as ROM, flash memory, etc.) or some combination of the two. This basic configuration is illustrated in FIG. 6 by dashed line 606. The computer 600 may include additional storage (removable and/or non-removable) including, but not limited to, magnetic or optical disks or tape. Such additional storage is illustrated in FIG. 6 by removable storage 608 and non-removable storage 610.

A computer storage medium is any medium in which data can be stored in and retrieved from addressable physical storage locations by the computer. Computer storage media includes volatile and nonvolatile, removable and non-removable media. Memory 604, removable storage 608 and non-removable storage 610 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage media and communication media are mutually exclusive categories of media.

The computer 600 also may include communications connection(s) 612 that allow the computer to communicate with other devices over a communication medium. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. Communications connections 612 are devices, such as a network interface or radio transmitter, that interface with the communication media to transmit data over and receive data from communication media.

Computing machine 600 may have various input device(s) 614 such as a keyboard, mouse, pen, camera, touch input device, and so on. Output device(s) 616 such as a display, speakers, a printer, and so on may also be included. All of these devices are well known in the art and need not be discussed at length here.

The various components in FIG. 6 are generally interconnected by an interconnection mechanism, such as one or more buses 630.

Each component of such the system described herein that operates on a computer generally is implemented using one or more computer programs processed by one or more processing units in the computer. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the computer to include various devices or data structures. This computer system may be practiced in distributed computing environments where tasks are performed by remote computers that are linked through a communications network. In a distributed computing environment, computer programs may be located in both local and remote computer storage media.

It should be understood that the subject matter defined in the appended claims is not necessarily limited to the specific implementations described above. The specific implementations described above are disclosed as examples only.

What is claimed is:

1. A computer-implemented process for generating an edited video program for an event in a venue, wherein the venue includes one or more cameras that capture video of activity in the venue, comprising:
    continuously receiving video data from the one or more cameras during periods of time during the event;
    storing the received video data for each camera in one or more data files, each data file including video data from the camera for a period of time during the event;
    receiving, and storing in a tag database, tag data from a plurality of user devices associated with users who are not participants in the activity, the tag data including a plurality of tag hits including, for each tag hit, a time and an identifier of the user device, wherein a tag hit indicates interest by a user in video for the activity occurring at the time of the tag hit;
    receiving an indication of an individual;
    accessing the stored tag data, using the indication of the individual, to retrieve times associated with tag data associated with the individual; and
    accessing the stored video data to retrieve clips of the stored video data according to the retrieved times for tag hits associated with the individual.

2. The computer-implemented process of claim 1, wherein the indication of the individual is the identifier of the user device used by the user to enter tag hits.

3. The computer-implemented process of claim 1, further comprising:
    accessing data associating permissions with each of the users; and
    wherein accessing the stored video data by a user is conditioned upon the permissions associated with the user.

4. The computer-implemented process of claim 1, wherein the tag database comprises a database table comprising a row for each tag hit including at least a first column indicating a time for the tag hit.

5. The computer-implemented process of claim 4, wherein the database table is provided for each user device.

6. The computer-implemented process of claim 4, wherein the database table further includes a second column for an identifier of the user device.

7. The computer-implemented process of claim 4, wherein the tag database includes a table including rows relating identifiers of user devices to information used to control access to the stored video data.

8. A computer-implemented process for generating an edited video program using video captured from one or more cameras and tag data indicating times at which tag hits are received on user devices, the process comprising:
    receiving and storing video data from the one or more cameras during periods of time, the received video data for each camera being stored in one or more data files, each data file including video data from the camera for a period of time;
    receiving, and storing in a tag database, tag data from a plurality of user devices associated with users who are not participants in the activity, the tag data including a plurality of tag hits including, for each tag hit, a time and an identifier of the user device, wherein a tag hit indicates interest by a user in video for the activity occurring at the time of the tag hit;
    accessing the stored tag data, using an indication of a user, to retrieve times at which tag hits associated with the individual were received;
    identifying one or more cameras corresponding to the tag data and stored video data from the identified cameras which include video data from the retrieved times for the tag data; and
    accessing the stored video data for the identified cameras to retrieve clips of the stored video data from the identified cameras according to the retrieved times from the tag data.

9. The computer-implemented process of claim 8, wherein the indication of the individual is the identifier of the user device used by the user to enter tag hits.

10. The computer-implemented process of claim 8, further comprising:
    accessing data associating permissions with each of the users; and
    wherein accessing the stored video data by a user is conditioned upon the permissions associated with the user.

11. The computer-implemented process of claim 8, wherein the tag database comprises a database table comprising a row for each tag hit including at least a first column indicating a time for the tag hit.

12. The computer-implemented process of claim 11, wherein the database table is provided for each user device.

13. The computer-implemented process of claim 11, wherein the database table further includes a second column for an identifier of the user device.

14. The computer-implemented process of claim 11, wherein the tag database includes a table including rows relating identifiers of user devices to information used to control access to the stored video data.

15. A computer system for generating an edited video program for an individual from a set of individuals participating in an event in a venue, wherein the venue includes a plurality of cameras that capture video of the individuals and a plurality of sensors, each sensor associated with one or more cameras of the plurality of cameras, each of the sensors at least detecting proximity of an individual near the sensor, the computer system comprising:
    a processing unit, a computer storage medium and a database, and interfaces connected to receive data from the plurality of sensors and to receive video data from the plurality of cameras;
    the processing unit executing computer program instructions to be operative to:
    continuously receive the video data from the plurality of cameras during periods of time during the event;
    store the received video data for each camera in a sequence of data files in the computer storage, each data file in the sequence being created in regular time intervals, each data file having as associated time interval and including video data from the camera for a period of time during the event in the associated time interval, each data file in the sequence being accessible using an identifier of the camera providing the received video data and data representing the time interval;
    continuously receive the data from the plurality of sensors during periods of time during the event, the received data, from each sensor, being indicative of individuals and times at which proximity of the individuals to the sensor is detected by the sensor;
    store the received data from each sensor in the database such that the database stores, for each sensor, an identifier of each individual detected in the proximity of the sensor by the sensor, and a time at which the individual was detected in the proximity of the sensor by the sensor;

receiving, and storing in a tag database, tag data from a plurality of user devices associated with users who are not participants in the activity, the tag data including a plurality of tag hits including, for each tag hit, a time and an identifier of the user device, wherein a tag hit indicates interest by a user in video for the activity occurring at the time of the tag hit;

receive an indication of a user;

determine an indication of an individual associated with the user;

access, from the database, the stored data from the sensors, using the indication of the individual, to retrieve times from the database at which the individual was detected in the proximity of one or more of the sensors by the one or more of the sensors, and identifiers of the one or more of the sensors; and access the stored video data from the computer storage to retrieve clips of the stored video data received from cameras associated with the one or more sensors, according to the retrieved times from the database at which the individual was detected in the proximity of one or more sensors by the one or more of the sensors and the times associated with the tag hits from the user device associated with the user.

16. The computer system of claim 15, further comprising stored data associating permissions with each of the users, and wherein the processing system is further operative to condition access to the stored video data by a user upon the permissions associated with the user.

17. The computer system of claim 15, wherein the indication of the individual is the identifier of the user device used by the user to enter tag hits.

18. The computer system of claim 15, wherein the tag database comprises a database table comprising a row for each tag hit including at least a first column indicating a time for the tag hit.

19. The computer system of claim 18, wherein the database table is provided for each user device.

20. The computer system of claim 18, wherein the database table further includes a second column for an identifier of the user device.

\* \* \* \* \*